US012619728B2

(12) United States Patent (10) Patent No.: US 12,619,728 B2
Melicher et al. (45) Date of Patent: May 5, 2026

(54) DETECTING PATIENT-ZERO EXFILTRATION ATTACKS ON WEBSITES USING TAINT TRACKING

(71) Applicant: Palo Alto Networks, Inc., Santa Clara, CA (US)

(72) Inventors: William Russell Melicher, Sunnyvale, CA (US); Mohamed Yoosuf Mohamed Nabeel, San Jose, CA (US); Oleksii Starov, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 135 days.

(21) Appl. No.: 18/513,869

(22) Filed: Nov. 20, 2023

(65) Prior Publication Data

US 2024/0095361 A1 Mar. 21, 2024

Related U.S. Application Data

(63) Continuation-in-part of application No. 17/500,308, filed on Oct. 13, 2021, now Pat. No. 11,973,780.
(Continued)

(51) Int. Cl.
*G06F 21/00* (2013.01)
*G06F 21/56* (2013.01)

(52) U.S. Cl.
CPC ...... *G06F 21/566* (2013.01); *G06F 2221/033* (2013.01)

(58) Field of Classification Search
CPC .......................... G06F 21/566; G06F 2221/033
See application file for complete search history.

(56) References Cited

U.S. PATENT DOCUMENTS 7,886,043 B1 2/2011 Chan et al.
8,949,660 B1 2/2015 Pupius et al.
(Continued)

FOREIGN PATENT DOCUMENTS

EP 3379443 A1 9/2018
WO 2017151515 A1 9/2017

OTHER PUBLICATIONS

Hough, et al., "A Practical Approach for Dynamic Taint Tracking with Control-flow Relationships", ACM Transactions on Software Engineering and Methodology, vol. 31, No. 2, Article 26, Dec. 2021, 43 pages, https://doi.org/10.1145/3485464.
(Continued)

*Primary Examiner* — Michael M Lee
(74) *Attorney, Agent, or Firm* — Gilliam IP PLLC

(57) ABSTRACT

An execution environment has been designed that detects likely data exfiltration by using taint tracking and abstract execution. The execution environment is instrumented to monitor for use of functions identified as having functionality for transferring data out of an execution environment. In addition, heuristics-based rules are defined to mark or "taint" objects (e.g., variables) that are likely targets for exfiltration. With taint tracking and control flow analysis, the execution environment tracks the tainted objects through multiple execution paths of a code sample. After comprehensive code coverage, logged use of the monitored functions are examined to determine whether any tainted objects were passed to the monitored functions. If so, the logged use will indicate a destination or sink for the tainted source. Each tainted source-sink association can be examined to verify whether the exfiltration was malicious.

20 Claims, 4 Drawing Sheets

Related U.S. Application Data

(60) Provisional application No. 63/091,625, filed on Oct. 14, 2020.

(56) References Cited

U.S. PATENT DOCUMENTS

| | | | | |
|---|---|---|---|---|
| 9,027,128 | B1 | 5/2015 | Oliver et al. | |
| 9,530,016 | B1* | 12/2016 | Pomerantz | G06F 21/566 |
| 9,565,202 | B1* | 2/2017 | Kindlund | H04L 63/145 |
| 10,581,879 | B1* | 3/2020 | Paithane | G06F 21/566 |
| 2009/0064118 | A1 | 3/2009 | Raber | |
| 2012/0210432 | A1* | 8/2012 | Pistoia | G06F 11/3604 |
| | | | | 726/25 |
| 2014/0047538 | A1* | 2/2014 | Scott | H04L 63/1433 |
| | | | | 726/22 |
| 2014/0053056 | A1 | 2/2014 | Weber et al. | |
| 2014/0130158 | A1 | 5/2014 | Wang | |
| 2014/0359776 | A1* | 12/2014 | Liu | H04L 63/1466 |
| | | | | 726/25 |
| 2015/0326599 | A1 | 11/2015 | Vissamsetty | |
| 2017/0195353 | A1 | 7/2017 | Taylor et al. | |
| 2017/0293477 | A1* | 10/2017 | Takata | G06F 21/56 |
| 2018/0285567 | A1* | 10/2018 | Raman | G06F 21/566 |
| 2018/0300480 | A1 | 10/2018 | Sawhney et al. | |
| 2019/0238566 | A1 | 8/2019 | Wang et al. | |
| 2019/0361685 | A1 | 11/2019 | Viswanath | |
| 2020/0193030 | A1 | 6/2020 | Ikeda | |
| 2022/0067172 | A1* | 3/2022 | Bonetta | G06F 21/577 |
| 2022/0269776 | A1* | 8/2022 | Nalluri | G06F 21/577 |

OTHER PUBLICATIONS

Karim, et al., "Platform-Independent Dynamic Taint Analysis for JavaScript", IEEE Transactions on Software Engineering, vol. 46, No. 12, Dec. 2020, 16 pages.

Kolbitsch, et al., "Rozzle: De-Cloaking Internet Malware", 2012 IEEE Symposium on Security and Privacy, May 2012, 15 pages.

Melicher, et al., "Riding out DOMsday: Toward Detecting and Preventing DOM Cross-Site Scripting", Network and Distributed System Security (NDSS) Symposium 2018, Feb. 2018, 15 pages, http://dx.doi.org/10.14722/ndss.2018.23309.

Moser, et al., "Exploring Multiple Execution Paths for Malware Analysis", 2007 IEEE Symposium on Security and Privacy (SP '07), May 2007, 15 pages.

Wong, et al., "Driving Execution of Target Paths in Android Applications with (a) CAR", ASIA CCS '22: Proceedings of the 2022 ACM on Asia Conference on Computer and Communications Security, May 2022, 15 pages; https://doi.org/10.1145/3488932.3497765.

Xu, et al., "Multi-path exploration guided by taint and probability against evasive malware", Security and Safety, vol. 2, 2023023 (2023), 24 pages, https://doi.org/10.1051/sands/2023023.

"Free Javascript Obfuscater", 2016.

"JSFuck—Write any JavaScript with 6 Characters", Retrieved on Sep. 30, 2021.

Bary, "Analyzing Magecart Malware—From Zero to Hero", Tech Blog, Jan. 15, 2020.

Canali, et al., "Prophiler: A Fast Filter for the Large-Scale Detection of Malicious Web Pages", HAL Archives, Sep. 3, 2012.

Capacitorset, et al., "A Tool For Studying JavaScript Malware", 2020.

Chen, et al., "Towards an Understanding of Anti-Virtualization and Anti-Debugging Behavior in Modern Malware", 2008.

Curtsinger, et al., "ZOZZLE: Fast and Precise In-Browser JavaScript Malware Detection", 2011.

Datacamp, "prop.test: Test of Equal or Given Proportions, prop.test function, RDocumentation", Retrieved on Sep. 30, 2021.

Di Paolo, "Advanced JS Deobfuscation via AST and Partial Evaluation (Google Talk WrapUp)", IMQ Minded Security Blog, Oct. 28, 2015.

Ducklin, "Ransomware in Your Inbox: the rise of malicious JavaScript attachments", Apr. 26, 2016.

Fass, et al., "HideNoSeek: Camouflaging Malicious JavaScript in Benign ASTs", CCS '19: Proceedings of the 2019 ACM SIGSAC Conference on Computer and Communications Security, Nov. 2019, pp. 1899-1913. <https://doi.org/10.1145/3319535.3345656>.

Fass, "JAST: Fully Syntactic Detection of Malicious (Obfuscated) JavaScript", DIMVA 2018: Detection of Intrusions and Malware, and Vulnerability Assessment. Lecture Notes in Computer Science, vol. 10885. Springer, Cham.<https://doi.org/10.1007/978-3-319-93411-2_14>, 2018.

Fass, et al., "JSTAP: A Static Pre-Filter for Malicious JavaScript Detection", ACSAC '19: Proceedings of the 35th Annual Computer Security Applications Conference, Dec. 2019, pp. 257-269 <https://doi.org/10.1145/3359789.3359813>.

Github, "JavaScript Obfuscator", Retrieved on Sep. 30, 2021.

Github, "Obfuscate JavaScript (beyond repair) With Ruby", Retrieved on Sep. 30, 2021.

Github, "Repository of Yara Rules", Retrieved on Sep. 30, 2021.

Github, "Secure and Isolated JS Environments for Nodejs", Retrieved on Sep. 30, 2021.

Google, "Closure Compiler", Google Developers, 2020.

Hu, et al., "JSForce: A Forced Execution Engine for Malicious JavaScript Detection", cited in parent U.S. Appl. No. 17/500,308, Jan. 2017.

Hunter, "ViperSoftX—New JavaScript Threat", Feb. 14, 2020.

Invernizzi, et al., "Cloak of Visibility: Detecting When Machines Browse a Different Web", Proceedings of 2016 IEEE Symposium on Security and Privacy (SP), May 22-26, 2016, San Jose, CA, 17 pages.

javascriptobfuscator.com, "The Most Secure Way to Protect JavaScript Code, JavaScript Obfuscator: Protects JavaScript Code From Stealing and Shrinks Size", Retrieved on Sep. 30, 2021.

Kaplan, et al., ""NOFUS: Automatically Detecting" + String. fromCharCode(32) + "ObFUSCateD" .toLowerCase() + "JavaScript Code"", Microsoft Research Technical Report, 2011.

Kapravelos, et al., "Hulk: Eliciting Malicious Behavior in Browser Extensions", SEC'14: Proceedings of the 23rd USENIX conference on Security Symposium, Aug. 2014, pp. 641-654.

Kapravelos, et al., "Revolver: An Automated Approach to the Detection of Evasive Web-based Malware", SEC'13: Proceedings of the 22nd USENIX conference on Security, Aug. 2013, pp. 637-652.

Kim, et al., "J-Force: Forced Execution on JavaScript", WWW '17: Proceedings of the 26th International Conference on World Wide Web, Apr. 2017, pp. 897-906 <https://doi.org/10.1145/3038912.3052674>.

Kolbitsch, et al., "ROZZLE: De-Cloaking Internet Malware", Microsoft Research Technical Report, pp. 1-21, Oct. 25, 2011.

Leal, et al., "Malicious JavaScript Used in WP Site/Home URL Redirects", Jan. 21, 2020.

Lekies, et al., "The Unexpected Dangers of Dynamic JavaScript", 24th USENIX Security Symposium, Aug. 2015.

Li, et al., "SymJS: Automatic Symbolic Testing of JavaScript Web Applications", FSE 2014: Proceedings of the 22nd ACM SIGSOFT International Symposium on Foundations of Software Engineering, Nov. 2014, pp. 449-459 <https://doi.org/10.1145/2635868.2635913>.

Likarish, et al., "Obfuscated Malicious JavaScript Detection Using Classification Techniques", pp. 1-8, 2009.

Lu, et al., "Automatic Simplification of Obfuscated JavaScript Code: A Semantics-Based Approach", Department of Computer Science, University of Arizona, 2012.

Papernot, et al., "The Limitations of Deep Learning in Adversarial Settings", Retrieved from arXiv:1511.07528v1, Nov. 24, 2015.

Pochat, et al., "TRANCO: A Research-Oriented Top Sites Ranking Hardened Against Manipulation", Dec. 17, 2018.

Richards, et al., "The Eval That Men Do: A Large-Scale Study of the Use of Eval in JavaScript Applications", 2011.

Security News, "JavaScript Malware in Spam Spreads Ransomware, Miners, Spyware, Worm", Retrieved on Sep. 30, 2021.

Sen, "Jalangi: A Selective Record-Replay and Dynamic Analysis Framework for JavaScript", ESEC/FSE 2013: Proceedings of the

(56)    References Cited

OTHER PUBLICATIONS 2013 9th Joint Meeting on Foundations of Software Engineering, Aug. 2013, pp. 488-498 <https://doi.org/10.1145/2491411. 2491447>.

Serafim, et al., "JavaScript Obfuscator Tool", Retrieved on Sep. 30, 2021.

Sommer, et al., "Outside the Closed World: On Using Machine Learning for Network Intrusion Detection", In 2010 IEEE Symposium on Security and Privacy, 12 pages, May 2010.

Sophos, "JavaScript Malware Finds New Life, JavaScript Malware Attacks, Securing Java With Advanced Threat Protection", Retrieved on Sep. 30, 2021.

Stock, et al., "Kizzie: A signature compiler for exploit kits", In International Conference on Dependable Systems and Networks (DSN), Feb. 2015.

Suciu, et al., "Exploring Adversarial Examples in Malware Detection", 2019 IEEE Security and Privacy Workshops (SPW).

Tang, et al., "Dual-Force: Understanding WebView Malware via Cross-Language Forced Execution", ASE '18: Proceedings of the 33rd ACM/IEEE International Conference on Automated Software Engineering, Sep. 2018, pp. 714-725 <https://doi.org/10.1145/ 3238147.3238221>.

Tellenbach, et al., "Detecting Obfuscated JavaScripts from Known and Unknown Obfuscators using Machine Learning", 2016.

Wang, et al., "A deep learning approach for detecting malicious JavaScript code", Security and Communication Networks vol. 9, pp. 1520-1534, Published online Feb. 11, 2016 in Wiley Online Library (wileyonlinelibrary. com) <https://doi.org/10.1002/sec.1441>.

Wang, et al., "JSDC: A Hybrid Approach for JavaScript Malware Detection and Classification", ASIA CCS '15: Proceedings of the 10th ACM Symposium on Information, Computer and Communications Security, Apr. 2015, pp. 109-120 <https://doi.org/10.1145/ 2714576.2714620>.

Wilson, "Probable Inference, the Law of Succession, and Statistical Inference", Journal of the American Statistical Association, vol. 22, No. 158 (Jun. 1927), pp. 209-212.

Xu, et al., "JStill: Mostly Static Detection of Obfuscated Malicious JavaScript Code", CODASPY '13: Proceedings of the third ACM conference on Data and application security and privacy, Feb. 2013, 12 pages, https://doi.org/10.1145/2435349.2435364.

Xu, et al., "The Power of Obfuscation Techniques in Malicious JavaScript Code: A Measurement Study", 2012 7th International Conference on Malicious and Unwanted Software, Oct. 2012, 8 pages.

You, et al., "Malware Obfuscation Techniques: A Brief Survey", 2010 International Conference on Broadband, Wireless Computing, Communication and Applications, IEEE 2010, pp. 297-300.

Zaharia, "JavaScript Malware—a Growing Trend Explained for Everyday Users", 2016.

\* cited by examiner

DETECTING PATIENT-ZERO EXFILTRATION ATTACKS ON WEBSITES USING TAINT TRACKING

BACKGROUND

The disclosure generally relates to anti-malware arrangements and malware detection (e.g., CPC G06F 21/56).

Data exfiltration is the unauthorized transfer of data from a host, usually conducted in a discrete manner. Phishing and malware are sometimes used to carry out this type of attack. Examples of malware for data exfiltration includes skimmers. A skimmer or web skimmer is malware embedded in web payment pages that skims customer data. To avoid detection, malicious actors employ obfuscation techniques.

Obfuscation techniques are employed for malicious and legitimate purposes. Developers use software packing to conserve space and use data and code obfuscation to protect intellectual property. Some websites use obfuscation to prevent plagiarism. Malicious actors use obfuscation or malware obfuscation to evade detection. One example of a malicious use of an obfuscation technique is randomization, which is the random change in code elements without changing semantics. Another technique is encoding obfuscation. Encoding obfuscation can be done by converting code into escaped American Standard Code for Information Interchange (ASCII) characters, using a custom encoding function and attaching the decoding function, and using standardized encryption and decryption methods. Another malware obfuscation technique is logic structure obfuscation. Logic structure obfuscation changes the logic structure to manipulate execution paths without affecting original semantics of the code.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses the term "exfiltration sink" to refer to a destination of an exfiltration. The term is sometimes used in the art to refer to an exfiltrating function and the destination. However, this description narrows the meaning to only the destination to avoid confusion and overloading the term. An "exfiltration endpoint" refers to a function instance and the sink associated with the function instance.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

An execution environment has been designed that detects likely data exfiltration by using taint tracking and abstract execution. The execution environment is instrumented to monitor for use of functions identified as having functionality for transferring data out of an execution environment. In addition, heuristics-based rules are defined to mark or "taint" objects (e.g., variables) that are likely targets for exfiltration. With taint tracking and control flow analysis, the execution environment tracks the tainted objects through multiple execution paths of a code sample. After comprehensive code coverage, logged use of the monitored functions are examined to determine whether any tainted objects were passed to the monitored functions. If so, the logged use will indicate a destination or sink for the tainted source. Each tainted source-sink association can be examined (e.g., with machine learning or against a list of known malicious websites) to verify whether the exfiltration was malicious.

Example Illustrations

Figure 1:
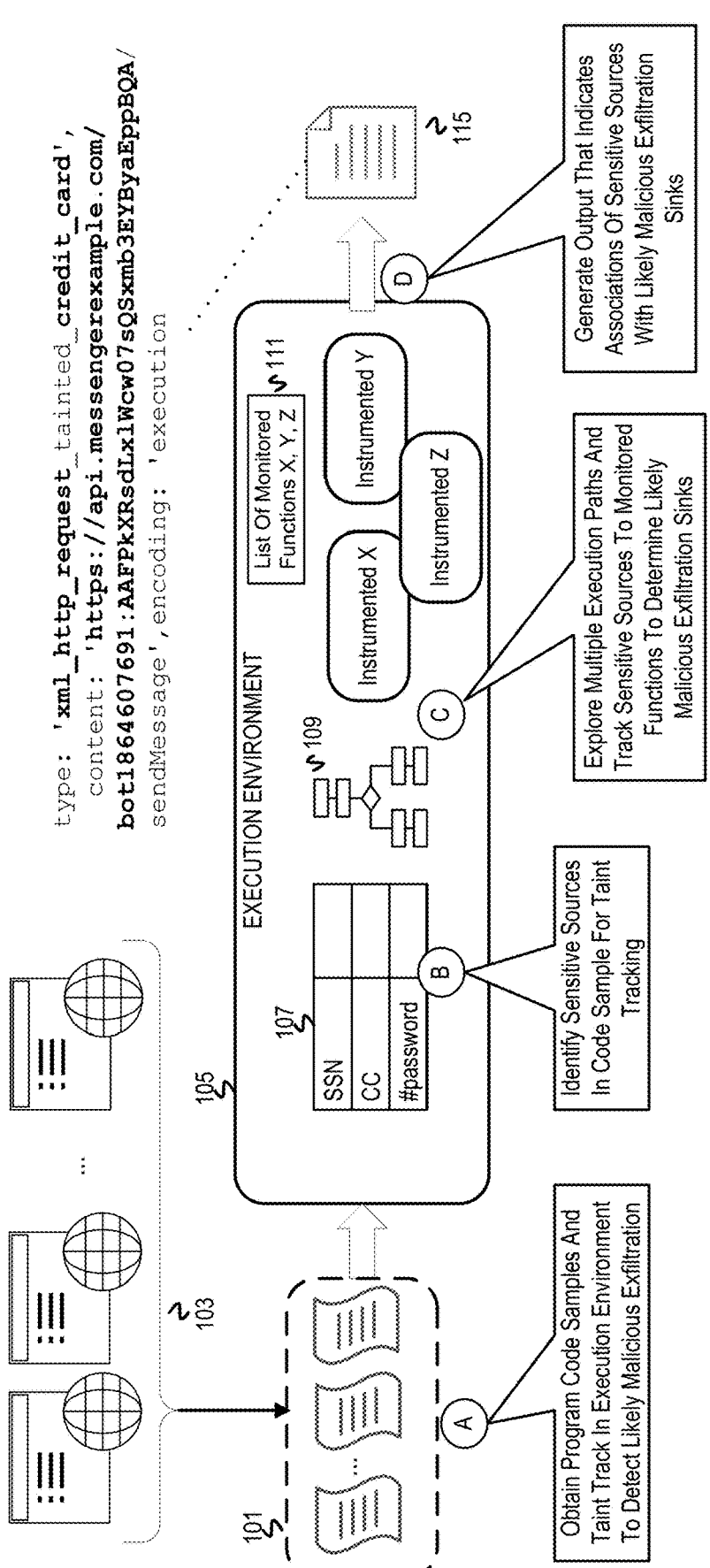
FIG. 1 depicts a diagram of an execution environment that employs taint tracking through multiple execution paths of code samples to detect likely data exfiltration.

FIG. 1 depicts a diagram of an execution environment that employs taint tracking through multiple execution paths of code samples to detect likely data exfiltration. An execution environment 105 performs concrete and abstract interpretation/execution of code samples. The execution environment 105 identifies points in control flow of a code sample that allow for alternative execution paths. The execution environment 105 then selectively applies abstract execution to these control flow points for comprehensive code coverage. This allows evaluation of code paths that can evade static and dynamic analysis. Since abstract execution utilizes alternative values for objects which increases memory consumption, the selective use of abstract execution for the identified control flow points where branching occurs tempers the increase in memory consumption. A list of monitored functions 111 is a configurable list of functions identified as having functionality for transferring data outside of an execution environment. These functions may be application programming interface (API) calls or "built-in" functions of an execution environment. If a code sample is intended to run in a browser, then the built-in functions of the execution environment 105 would be the built-in functions of a browser.

FIG. 1 is annotated with a series of letters A-D, each of which represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the execution environment 105 obtains samples 101 of program code from crawled websites 103. The execution environment 105 then taint tracks sensitive sources of each code sample through multiple execution paths of the code sample to detect likely malicious data exfiltration.

At stage B, the execution environment 105 identifies sensitive sources in the code sample for taint tracking. The execution environment 105 identifies each object in the code sample that is a sensitive source according to heuristics-based rules. The heuristics-based rules encode characteristics that have been observed to be indicators of a source of sensitive data/information. As examples, a sensitive source can be a cookie, have a particular naming pattern (e.g., suggestive of a password or credit card number), and be a component of a document object model (DOM). The execution environment tags or marks the objects identified as sensitive sources. This "marking" can be associating a tag with an object name, setting a flag in a memory location allocated to the object or a shadow memory location, or instantiating a data structure for tracking values of sensitive sources. In this illustration, the execution environment 105 instantiates a data structure 107 that indicates tainted objects to be tracked according to propagation rules, which are typically indicated in a taint tracking policy.

At stage C, the execution environment 105 explores execution paths of the code sample and taint tracks the tainted objects/sensitive sources through the execution paths. The execution environment 105 generates a control flow graph of the code sample and uses values to satisfy conditions that trigger execution of different paths at branched paths. As the tainted objects propagate, the execution environment 105 updates the data structure 107. As the monitored functions identified in the list of monitored function 111 have been instrumented, invocation or use of any one of the instrumented functions will trigger logging that captures the use. This logging captures the used function, any object passed the function, and a destination or sink.

At stage D, the execution environment 105 generates output 115 based on the logging. The output 115 indicates sensitive source-sink associations. The sinks are likely malicious exfiltration sinks to be verified with additional analysis. FIG. 1 depicts an example snippet of the output 115.

type: 'xml_http_request_tainted_credit_card',
    content:
    'https://api.messengerexample.com/bot1864607691:
      AAFPOCRsdLxlWcw07sQSxmb3EYByaEppBQA/
      sendMessage',
    encoding: 'execution This snippet of the output 115 indicates that the sample code attempted to invoke the monitored function XmlHapRequest to send a message including a credit_card_object.

The snippet of the output 115 also indicates that the sink is api.messengerexample.com/bot1864607691.

Figure 2:
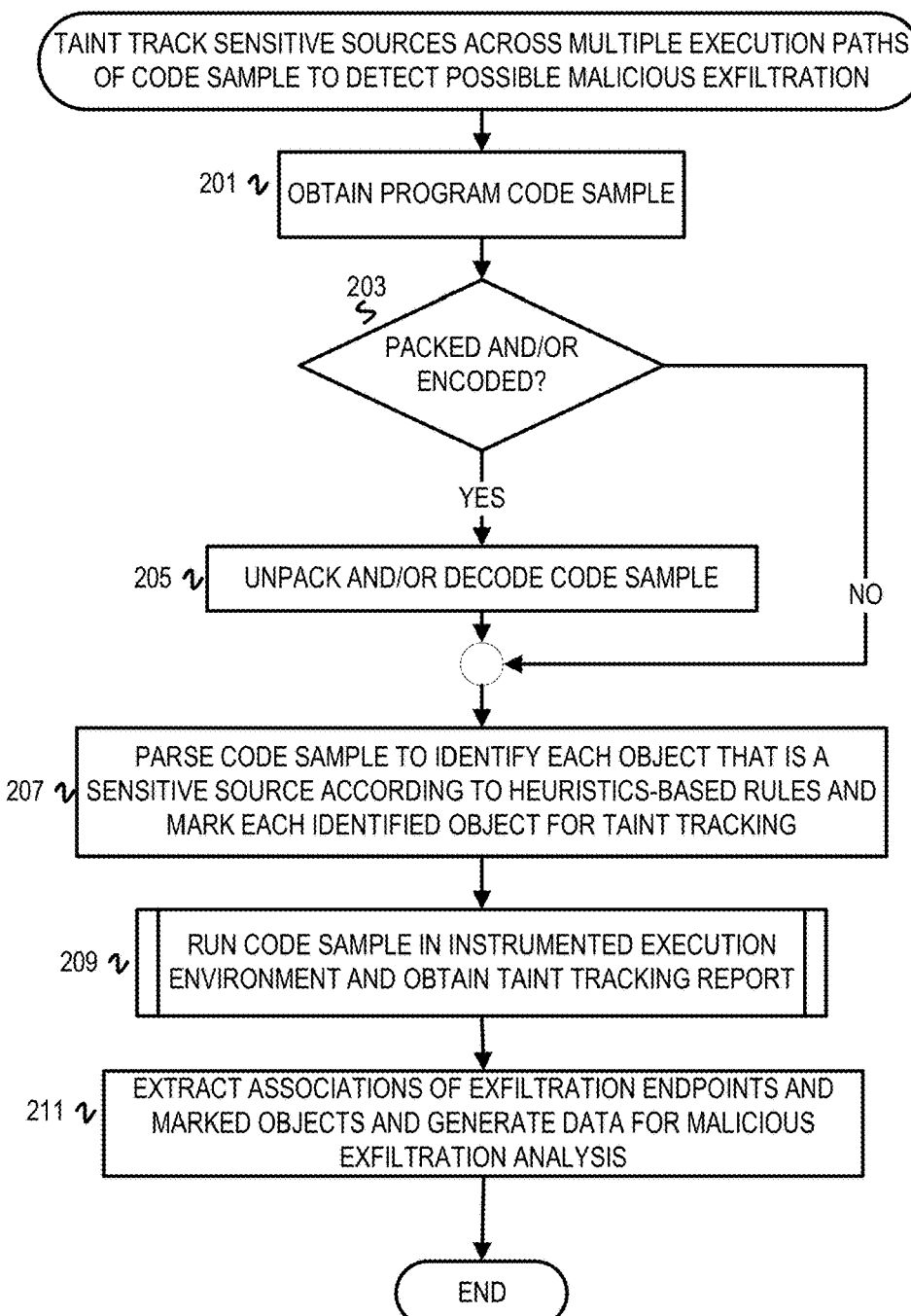
FIG. 2 is a flowchart of example operations for taint tracking sensitive sources across multiple execution paths of a code sample to detect possible malicious exfiltration.
Figure 3:
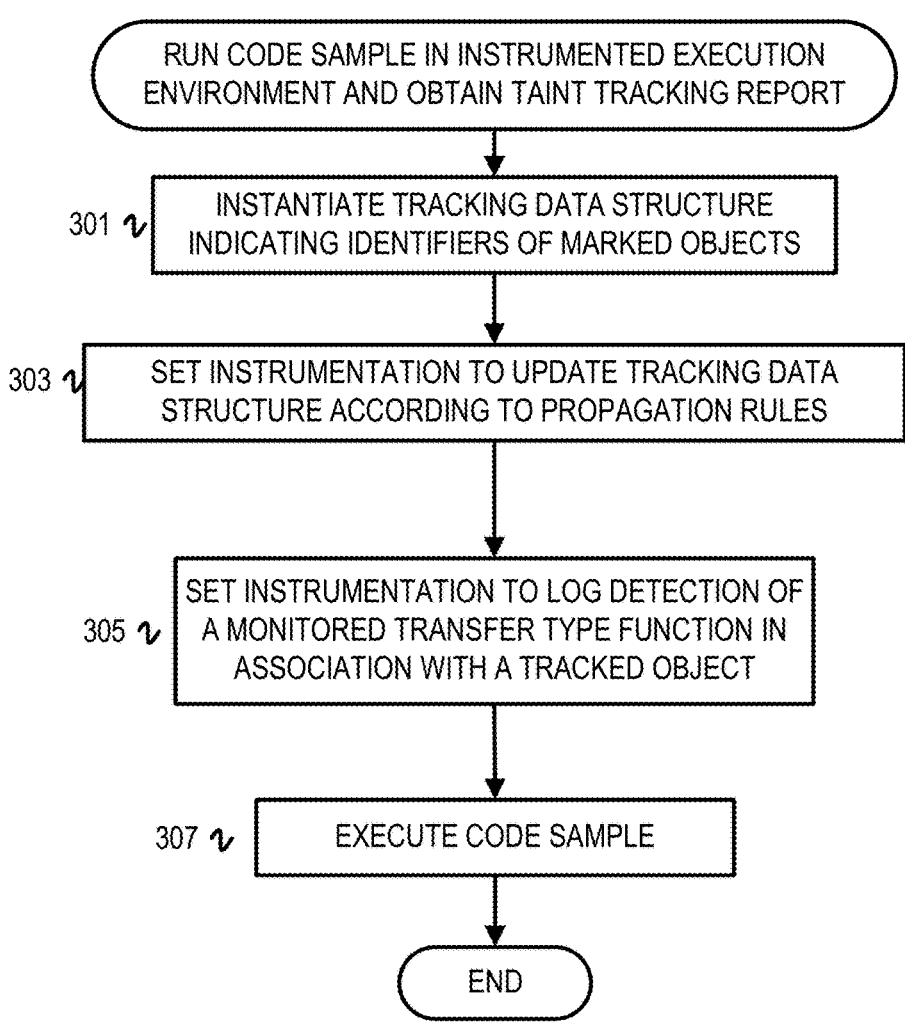
FIG. 3 is a flowchart of example operations for running a code sample in an instrumented execution environment and obtaining a taint tracking report.

The instrumented execution environment can be deployed offline (e.g., analyzing code samples obtained from offline crawling) or inline (e.g., examining code samples being retrieved when users visit websites). The instrumented execution environment selectively use of abstract execution allows for a rapid detection time that does not impair user experience when deployed inline. Moreover, the comprehensive code coverage addresses evasive techniques while not only detecting exfiltration but identifying the sink or destination of the exfiltration. FIG. 1 depicted a limited example diagram of the execution environment. FIGS. 2-3 provide flowcharts that are not limited to the same example, but refer to an exfiltration tool that includes or uses the execution environment when describing the example operations of the flowcharts for consistency with the earlier description.

FIG. 2 is a flowchart of example operations for taint tracking sensitive sources across multiple execution paths of a code sample to detect possible malicious exfiltration. As previously mentioned, the execution environment can be deployed inline or offline. As an example, an exfiltration detection tool that includes or interfaces with the execution environment can be run via a command line interface to run on demand or be invoked via a script. As another example, the exfiltration detection tool that implements or interfaces with the execution environment can be installed in a security appliance. The operations of FIG. 2 are described with reference to an exfiltration detection tool. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 201, the exfiltration detection tool obtains a program code sample. Obtaining a program code sample can involve retrieving from one or more files having code samples, retrieving code samples from a repository, and/or receiving an external feed. As previously mentioned, the data exfiltration tool may also obtain code samples from application layer messages detected in monitored network traffic.

At block 203, the exfiltration detection tool determines whether the program code sample has been packed and/or encoded. Detection of whether packing or encoding has been applied to the code sample can be done with various techniques, for example signature analysis. While some malware analysis tools infer evasive intent when packing and/or encoding is detected, this leads to false positives that the exfiltration detection tool avoids. If either of these techniques are detected, then operational flow proceeds to block 205. Otherwise, operational flow proceeds to block 207.

At block 205, the exfiltration detection tool unpacks and/or decodes the program code sample. The exfiltration detection tool can select an unpacking algorithm and/or decoding algorithm based on the results of the analysis employed to detect the packing and/or encoding. In some cases, unpacking is part of executing the code sample. In those cases, the unpacking would not be performed in advance, especially when a customer packer included in the code sample would also execute the code.

Add block 207, the exfiltration detection tool parses the code sample to identify each object that is a sensitive source according to heuristics-based rules. The exfiltration detection tool then marks each identified object for taint tracking. While the meaning of "object" can vary among programming languages, an object that could be a sensitive source would be assigned the value. For instance, an object that could be a sensitive source is a variable (e.g., SSN being variable of type integer) or component of an object (e.g., form.pword( ) being a string that is a member of the form object or document). The heuristics-based rules that indicate characteristics of sensitive sources can be part of the taint tracking policy or defined separately. This initial marking can be separate from the instantiation of a tracking data structure. For instance, the exfiltration detection tool can explicitly mark the objects by appending a tag to the object identifier or name, or set a flag for each of the identified objects that communicates to the execution environment that the marked object should be indicated in a taint tracking structure.

At block 209, the exfiltration detection tool runs the code sample in the instrumented execution environment and obtains a taint tracking report. Example operations that elaborate on this block are presented in FIG. 3.

FIG. 3 is a flow chart of example operations for running a code sample in an instrumented execution environment and obtaining a taint tracking report. The execution environment is described in more detail in U.S. Non-Provisional patent application Ser. No. 17/500,308 which issued as U.S. Pat. No. 11,973,780 on 2024 Apr. 30 and which is incorporated by reference in its entirety. The execution environment can perform static analysis with abstract interpretation/execution. The execution environment executes branched execution paths with abstract values to approximate code execution down the various paths. The execution environment calculates and maintains execution state for each execution path. State explosion is avoided or at least minimized by applying concrete execution to those portions of the code sample with predictable control flow (e.g., functions that lack branching).

At block 301, the exfiltration detection tool instantiates a tracking data structure indicating marked objects. The tracking data structure indicates marked objects with memory addresses allocated to the marked objects and can also indicate the names/identifiers of the marked objects. The tracking data structure is designed to accommodate multiple memory addresses that may arise due to the multiple execution paths. The tracking data structure is maintained to indicate propagation of marked objects. The tracking data structure can also be used to track values of marked objects across the execution paths of the code sample. The values of the marked objects may be informative in later analysis.

At block 303, the exfiltration detection tool sets instrumentation or hooks to update the tracking data structure according to propagation rules. The propagation rules defined in a taint tracking policy can specify operators and functions to monitor for taint propagation. Examples of operators and functions to monitor include =, a set method/function, string manipulation functions, etc. The propagation rules may also take into account object type. For instance, monitored string operations may be ignored for tainted objects that are not of a string type. When a monitored operator or function is detected, the exfiltration detection tool determines whether a tainted object is indicated in the corresponding instruction. If a tainted object is indicated in the corresponding instruction, then the execution environment updates the tracking data structure to indicate propagation of the object. As an example, a propagation rule may specify the stringify method and a code sample may include an integer object SIN that is likely to be assigned a social insurance number. When the below instructions are detected, the execution environment would update the tracking data structure to indicate comment_nameX as part of taint tracking SIN.

```
function example32(a_number) {
    return JSON.stringify(a_number)
}
...
comment_nameX = example32(SIN)
...
```

The execution engine has been programmed to implement the propagation rules and the taint tracking structure has been shared with the execution engine. When the execution environment passes an input state and an instruction into the execution engine, the execution engine implements the propagation rules against the listing of tainted objects indicated in the tracking structure.

At block 305, the exfiltration detection tool sets instrumentation to log detection of the monitored transfer type functions in association with the tracked object. In addition to the example of XmlHttpRequest, additional examples of transfer type functions to monitor include img src and form actions. Instrumentation is set to trigger evaluation and logging of a log condition is satisfied. The evaluation involves determining whether an instruction using the monitored function is passing a tainted object to the monitored transfer type function. The execution engine will search the listing of tainted objects to determine whether any one of them is being passed or referenced in the instruction. If so, the execution environment logs at least the tainted object identifier, the function being used, and the sink (i.e., the destination or endpoint).

At block 307, the exfiltration detection tool executes the code sample. For instance, the exfiltration detection tool begins passing an input state and a current instruction to an execution engine of the execution environment. The execution engine generates an execution state based on an input state and an instruction passed into the execution engine. The exfiltration detection tool can maintain the multiple execution states for multiple execution paths external to the execution engine.

Returning to FIG. 2, the exfiltration detection tool extracts associations of exfiltration endpoints and marked objects and generates data for malicious exfiltration analysis at block 211. The extraction operation presumes the taint tracking report includes data not necessary for the malicious exfiltration analysis. If it does not, then implementations may pass the taint tracking report unchanged or reorganize/reformat the taint checking report for malicious exfiltration analysis. As examples, the malicious exfiltration analysis may include a domain analysis of the sinks, graph analysis of the sinks, and machine learning analysis of the source-sink associations.

VARIATIONS

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
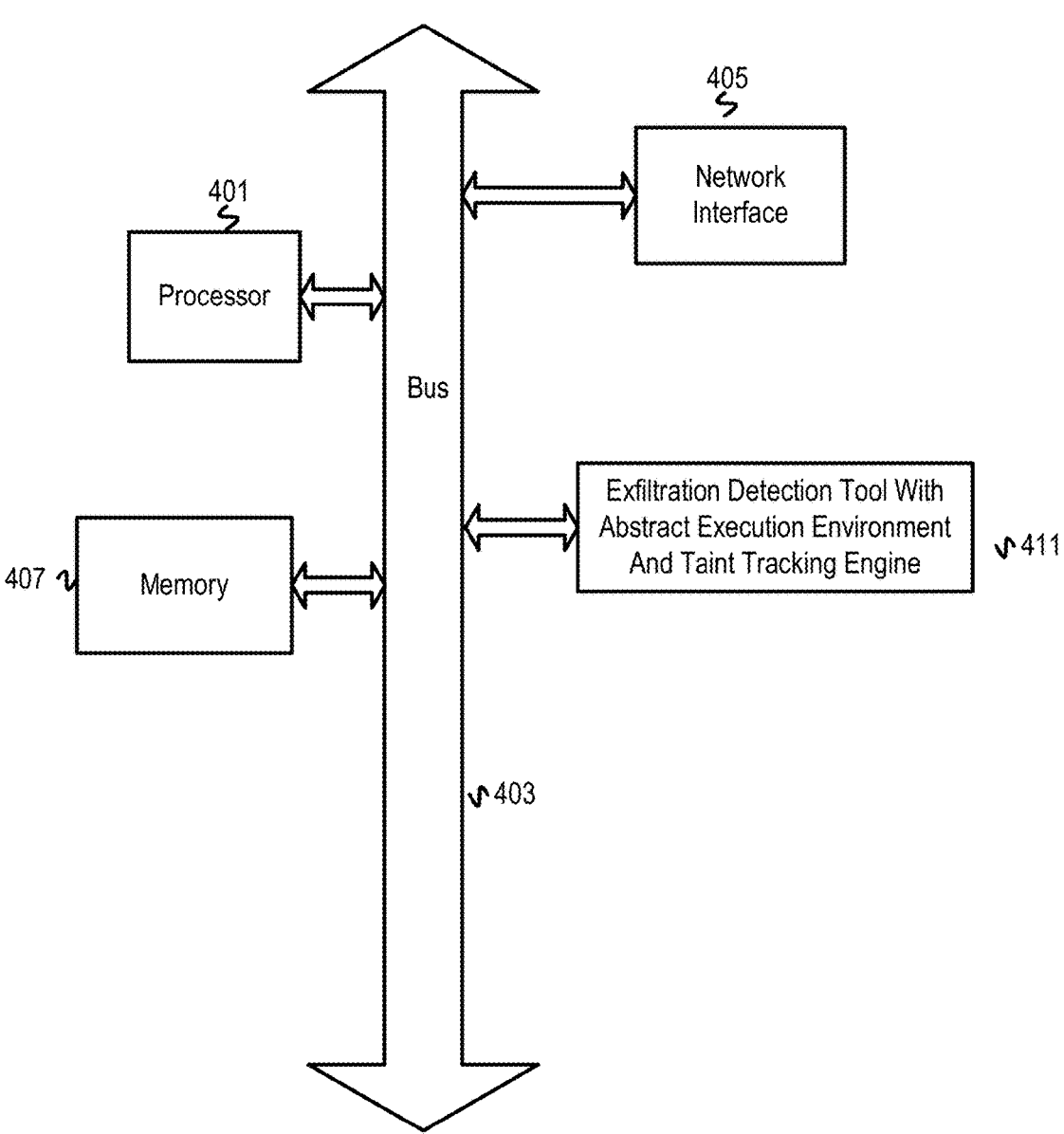
FIG. 4 depicts an example computer system with an exfiltration detection tool.

FIG. 4 depicts an example computer system with an exfiltration detection tool. The computer system includes a processor 401 (possibly including multiple processors, multiple cores, multiple nodes, and/or implementing multithreading, etc.). The computer system includes memory 407. The memory 407 may be system memory or any one or more of the above already described possible realizations of machine-readable media. The computer system also includes a bus 403 and a network interface 405. The system also includes an exfiltration detection tool 411 that includes an abstract execution environment and a taint tracking engine. The exfiltration detection tool 411 performs control flow analysis in multiple passes of a code sample to distinguish between predictable flows sections and branch points. The exfiltration detection tool 411 applies concrete execution to sections of the code sample with predictable flow and abstract execution at branch points for comprehensive code coverage. The execution environment passes an input execution state and a current instruction to an execution engine to obtain a next execution state from the execution engine. This allows the execution environment to maintain multiple execution states and join execution paths. The taint tracking engine identifies objects that are likely sensitive sources and taints those objects. The taint tracking engine then tracks those objects through the different execution paths. After exploring the multiple execution paths with the abstract execution environment, the exfiltration detection tool 411 determines whether any of the tainted objects have been tracked to monitored functions that can transfer data outside of an execution environment. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

The invention claimed is:

1. A method comprising:

taint tracking each sensitive source of a first code sample through multiple execution paths with abstract execution of the first code sample to one or more exfiltration sinks, wherein taint tracking each sensitive source comprises;

identifying each object in the first code sample that is a sensitive source based, at least in part, on heuristics-based rules;

marking each sensitive source for taint tracking;

identifying predictable flow sections and branch points with code flow analysis of the first code sample;

concretely executing the predictable flow sections and abstractly executing/interpreting the branch points to cover alternative execution paths;

for each sensitive source tracked to an exfiltration sink, indicating an association of the sensitive source and the exfiltration sink; and generating an indication of each association as a possible malicious exfiltration.

2. The method of claim 1, wherein marking each sensitive source for taint tracking comprises one of instantiating a data structure with an entry for each sensitive source and setting a flag for each sensitive source in a data structure that tracks values of objects during execution for each execution path covered with the abstract execution.

3. The method of claim 1, wherein the heuristics-based rules indicate at least one of a naming pattern, document object model type source, and a cookie type source.

4. The method of claim 1, wherein the taint tracking comprises executing the first code sample in an execution environment with instrumentation to monitor use of any one of a plurality of functions identified as having functionality for conveying data outside of the execution environment.

5. The method of claim 4 further comprising, for each marked sensitive source, determining whether the sensitive source is passed to one of the plurality of functions.

6. The method of claim 5, wherein the exfiltration sink is a destination specified in those of the plurality of functions determined to have been passed a sensitive source.

7. The method of claim 1 further comprising, for each association, determining whether the exfiltration sink is malicious.

8. The method of claim 1 further comprising at least one of crawling websites to obtain a plurality of code samples, receiving files with at least some of the plurality of code samples, and receiving one or more uniform resource locators (URLs) and visiting the URLs to obtain at least some of the plurality of code samples, wherein the plurality of code samples includes the first code sample.

9. A non-transitory machine-readable medium having program code stored thereon, the program code comprising instructions to:

obtain a first code sample;

identify each object in the first code sample that has one or more specified characteristics of an object that could be a sensitive source;

taint track each identified object through multiple execution paths of the first code sample in a secure execution environment, wherein the instructions to taint track each identified object through multiple execution paths comprise instructions to, identify predictable flow sections and branch points with code flow analysis of the first code sample;

concretely execute the predictable flow sections and abstractly execute/interpret the branch points to cover alternative execution paths;

based on the taint tracking, identify each instance of any one of a plurality of monitored functions that has been passed any taint tracked object, wherein each of the plurality of monitored functions would send data outside of an execution environment;

determine a destination of each identified monitored function instance; and indicate each determined destination as an exfiltration sink and the corresponding one of the taint tracked objects.

10. The non-transitory machine-readable medium of claim 9, wherein the program code further comprises instructions to deobfuscate the first code sample prior to taint tracking.

11. The non-transitory machine-readable medium of claim 9, wherein the program code further comprises instructions to analyze each indicated exfiltration sink to determine whether the exfiltration sink is malicious.

12. The non-transitory machine-readable media of claim 9, wherein the program code further comprises instructions to at least one of crawl websites to obtain at least some of a plurality of code samples, receive files with at least some of the plurality of code samples, and receive one or more uniform resource locators (URLs) and visit the URLs to obtain at least some of the plurality of code samples, wherein the plurality of code samples includes the first code sample.

13. The non-transitory machine-readable media of claim 9, wherein the one or more specified characteristics correspond to at least one of a naming pattern, being a document object model component, and being a cookie.

14. The non-transitory, machine-readable medium of claim 9, wherein the instructions to identify each object that has one or more specified characteristics of an object that could be a sensitive source comprise instructions to tag or mark an identifier of each identified object for taint tracking.

15. An apparatus comprising:

a processor; and a non-transitory machine-readable medium having instructions stored thereon, the instructions executable by the processor to cause the apparatus to:

obtain a first code sample;

identify each object in the first code sample that has one or more specified characteristics of an object that could be a sensitive source;

taint track each identified object through multiple execution paths of the first code sample in a secure execution environment, wherein the instructions to taint track each identified object through multiple execution paths comprise instructions to, identify predictable flow sections and branch points with code flow analysis of the first code sample;

concretely execute the predictable flow sections and abstractly execute/interpret the branch points to cover alternative execution paths;

based on the taint tracking, identify each instance of any one of a plurality of monitored functions that has been passed any taint tracked object, wherein each of the plurality of monitored functions would send data outside of an execution environment;

determine a destination of each identified monitored function instance; and indicate each determined destination as an exfiltration sink and the corresponding one of the taint tracked objects.

16. The apparatus of claim 15, wherein the machine-readable medium further comprises instructions executable by the processor to cause the apparatus to deobfuscate the first code sample prior to taint tracking.

17. The apparatus of claim 15, wherein the machine-readable medium further comprises instructions executable by the processor to cause the apparatus to analyze each indicated exfiltration sink to determine whether the exfiltration sink is malicious.

18. The apparatus of claim 15, wherein the machine-readable medium further comprises instructions executable by the processor to cause the apparatus to at least one of crawl websites to obtain at least some of a plurality of code samples, receive files with at least some of the plurality of code samples, and receive one or more uniform resource locators (URLs) and visit the URLs to obtain at least some of the plurality of code samples, wherein the plurality of code samples includes the first code sample.

19. The apparatus of claim 15, wherein the one or more specified characteristics correspond to at least one of a naming pattern, being a document object model component, and being a cookie.

20. The apparatus of claim 15, wherein the instructions to identify each object that has one or more specified characteristics of an object that could be a sensitive source comprise instructions executable by the processor to cause the apparatus to tag or mark an identifier of each identified object for taint tracking.

* * * * *